United States Patent
Cascetta et al.

(10) Patent No.: US 12,148,115 B2
(45) Date of Patent: Nov. 19, 2024

(54) ENTIRELY VIRTUAL PROCESS FOR OPTOMETRIC VALUES MEASUREMENTS

(71) Applicant: LUXOTTICA GROUP S.P.A., Milan (IT)

(72) Inventors: Cristian Cascetta, Milan (IT); Fabio Mazzarella, Busto Arsizio (IT); Luca Mazzocchi, Legnano (IT); Kamal Fahmy Salama, Monza (IT); Filippo Bruno, Milan (IT); Federico Ciuffolini, Pesaro (IT); Luca Moroni, Saronno (IT)

(73) Assignee: LUXOTTICA GROUP S.P.A., Milan (IT)

( * ) Notice: Subject to any disclaimer, the term of this patent is extended or adjusted under 35 U.S.C. 154(b) by 162 days.

(21) Appl. No.: 17/993,427

(22) Filed: Nov. 23, 2022

(65) Prior Publication Data
US 2023/0169742 A1    Jun. 1, 2023

(30) Foreign Application Priority Data
Nov. 26, 2021   (IT) .......................... 102021000030014

(51) Int. Cl.
*G06T 19/20* (2011.01)
*G02C 13/00* (2006.01)

(52) U.S. Cl.
CPC ............ *G06T 19/20* (2013.01); *G02C 13/003* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 10,140,777 B2 | 11/2018 | Nakagawa | |
| 11,215,845 B2 | 1/2022 | Schwarz et al. | |
| 2003/0123026 A1* | 7/2003 | Abitbol | G06Q 30/0641 351/204 |
| 2011/0007269 A1* | 1/2011 | Trumm | G02C 13/005 351/204 |

(Continued)

FOREIGN PATENT DOCUMENTS

| | | |
|---|---|---|
| EP | 3214595 A1 | 9/2017 |
| EP | 3425446 A1 | 1/2019 |

(Continued)

OTHER PUBLICATIONS

International Search Report with Written Opinion issued in International Application No. PCT/IB2022/061322; Application Filing Date Nov. 23, 2022; Date of Mailing May 9, 2023 (19 pages).

(Continued)

*Primary Examiner* — Jason A Pringle-Parker
(74) *Attorney, Agent, or Firm* — CANTOR COLBURN LLP (57) ABSTRACT

A computer-implemented method is provided for measuring optometric values and for manipulating a glasses frame remotely in order to manufacture lenses and provide customized glasses for a person. The method includes providing aesthetic indications on the correct position of the glasses in relation to the person's head, and assessing a degree of comfort in relation to the possibility of deformation of the arms and frame.

12 Claims, 3 Drawing Sheets

(56) References Cited

U.S. PATENT DOCUMENTS

| | | | |
|---|---|---|---|
| 2013/0088490 A1* | 4/2013 | Rasmussen | G06T 19/006 |
| | | | 345/421 |
| 2013/0321412 A1 | 12/2013 | Coon et al. | |
| 2019/0164210 A1* | 5/2019 | Kornilov | G06Q 30/0631 |
| 2020/0103675 A1* | 4/2020 | Schwarz | G06F 30/27 |
| 2020/0142224 A1* | 5/2020 | Schwarz | G02C 13/003 |
| 2020/0160556 A1* | 5/2020 | Cook | G02C 13/003 |
| 2020/0219326 A1* | 7/2020 | Goldberg | G06T 7/75 |
| 2020/0233239 A1 | 7/2020 | Schwarz et al. | |
| 2021/0209865 A1* | 7/2021 | Cunliffe | G06T 19/00 |
| 2021/0382329 A1* | 12/2021 | Ohlendorf | G01M 11/0228 |
| 2022/0148262 A1 | 5/2022 | Szabo et al. | |
| 2022/0252906 A1* | 8/2022 | Schwarz | G06F 30/10 |

FOREIGN PATENT DOCUMENTS

| | | |
|---|---|---|
| EP | 3657236 A1 | 5/2020 |
| JP | H06118349 A | 4/1994 |
| WO | 2020119843 A1 | 6/2020 |
| WO | 2021122826 A1 | 6/2021 |

OTHER PUBLICATIONS

Search Report issued in Italian Application No. 102021000030014; Application Filing Date Nov. 26, 2021; Date of Report Jun. 20, 2022 (8 pages).

* cited by examiner

ENTIRELY VIRTUAL PROCESS FOR OPTOMETRIC VALUES MEASUREMENTS

CROSS-REFERENCE TO RELATED APPLICATIONS

This application claims the benefit of Italian Application Serial No. 102021000030014 filed Nov. 26, 2021, the disclosure of which is incorporated herein by reference in its entirety.

BACKGROUND

The present present disclosure relates to an entirely virtual process for optometric value measurements.

In the state of the art, processes are known both for optometric value measurements and for the customization of objects, such as glasses, through the use of physical (and not virtual) measurements on reference objects, e.g. reference frames. However, the present present disclosure relates to entirely virtual processes, without any use of physical objects.

In the state of the art, processes are known to remotely measure physical characteristics of a person's head in order to make customized glasses by means of a virtual glasses testing process on virtual faces captured by electronic devices or digitally generated of a real person, such as virtual testing processes called Virtual Try On (VTO) or Virtual Mirror (VM).

The existing virtual testing processes are of two types.

A first type of virtual testing process involves a physical simulation of a process of positioning a pair of glasses on a face taking into account friction between a glasses frame and the face of the wearer and certain physical characteristics simulated in digital form such as the weight of the glasses, friction between the glasses and the head, elasticity of a glasses frame.

The physical positioning simulation process comprises predicting collisions between the glasses frame and the person's face by mathematically calculating the position at which the virtual glasses and virtual head of the person begin to intersect.

In the case of acetate virtual glasses, the frame is shifted upwards until the bridge of the virtual glasses rests on top of a nose of the virtual head representing a positioning depth. Collision detection is used to find physically realistic vertical positioning.

In the case of virtual glasses made of metal and mixed material, it is often the collisions between the wearer's nose and the nose pads of the glasses that determine the positioning.

This virtual positioning is effective for aesthetic purposes to clearly show a person how they look wearing glasses.

Disadvantageously, this type of process is particularly onerous in terms of calculation time.

Disadvantageously, physical modelling of the face-glasses system requires enormous approximation and formalization efforts. Furthermore, individual models of glasses require a large number of parameters such as the physical properties of each material of which the physical glasses are composed.

A second type of virtual testing process, such as EP3425446B1 or EP3649505B1, involves affine transformations comprising a set of preset reference points for a 3D virtual head model and a corresponding set of preset reference points for a 3D virtual glasses model. The set of preset measuring points can include two points of a nose and two points of ears. The process comprises searching for the optimal affine transformation in the form of a rotation and translation matrix that minimises a sum of distances between corresponding preset reference points on a virtual head model and the virtual glasses model. The main advantage of affine transformations is that they allow refined formalization of the problem. Existing processes are based on rules formalized by subject matter experts or inferred automatically from data. Disadvantageously, it is necessary to pre-set and note down the reference points used during the optimization step on the 3D head model and the 3D glasses model.

Disadvantageously, the alignment of reference points does not completely solve the problem of being able to measure optometric values remotely in such a fine way as to obtain measurements for the manufacture of glasses lenses.

SUMMARY

According to a non-limiting embodiment of the present present disclosure is to realise a process or computer-implemented method for measuring optometric values and for manipulating a glasses frame remotely in order to manufacture lenses, for producing customized glasses, for providing aesthetic indications on the correct position of the glasses in relation to the person's head, for assessing a degree of comfort in relation to the possibility of deformation of the arms and frame, which overcomes the disadvantages of the prior art.

According to a non-limiting embodiment of the present disclosure, this object is achieved by a process for measuring optometric values and for manipulating a glasses frame according to claim 1.

According to further embodiments of the present disclosure of the present present disclosure is to realise a computer program loadable into the memory of an electronic computer comprising instructions which, when the program is executed by the computer, implement a process for measuring optometric values and for manipulating a glasses frame remotely in order to manufacture lenses, for producing personalised glasses, for providing aesthetic indications as to the correct position of the glasses in relation to the person's head, for assessing a degree of comfort in relation to the possibility of deformation of the arms and frame, which overcomes the disadvantages of the prior art.

According to According to further embodiments of the present disclosure, such further object is achieved with a computer program according to claim 11.

Other features are provided in the dependent claims.

BRIEF DESCRIPTION OF THE DRAWINGS

The features and advantages of the present present disclosure will be more apparent from the following description, which is to be understood as exemplifying and not limiting, with reference to the appended schematic drawings, in which.

DETAILED DESCRIPTION

With reference to the above-mentioned figures, an entirely virtual process (also referred to herein as a computer-implemented method) is shown for measuring optometric values and manipulating a glasses frame 100 by means of a process for positioning 400 a virtual glasses frame 10 on a virtual head 20 in an optimal manner.

The measurement of optometric values refers to optometric measurements, such as lens centring, pantoscopic angle, in order to obtain all the data necessary to make glasses lenses.

Manipulations of a frame are understood to be adjustments to the geometric shape of the actual frame by means of the process of the present present disclosure.

Figure 1:
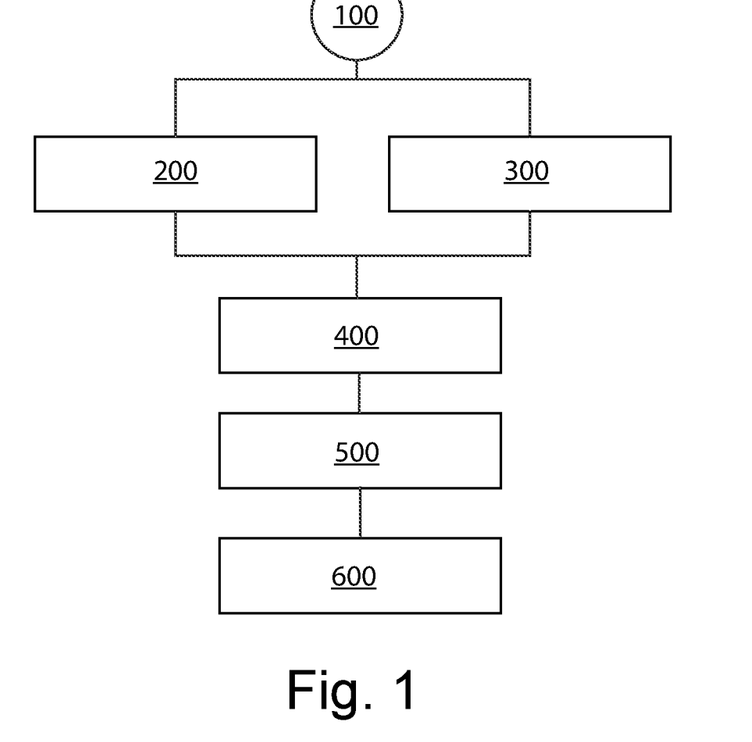
FIG. 1 is a block diagram of the process for measuring optometric values and for manipulating a glasses frame by means of a process for placing a virtual glasses frame on a virtual head of a person according to the present present disclosure.

Entirely virtual means that the process does not use physical measurements on reference objects, e.g. it does not use physical measurements on reference glasses frames. The process 100 according to the present present disclosure is entirely virtual, i.e. without any use of physical objects.

Advantageously, the process 100 of the present present disclosure makes it possible to produce customized glasses frames having, for example, customized nose pads or customized arms on a person's head.

Advantageously, the process 100 also makes it possible to provide aesthetic indications of the correct position of the glasses in relation to the person's head, an assessment of a degree of comfort in relation to the possibility of deformation of the arms, nose pads and the frame as a whole.

By optimal mode, we mean positioning the virtual glasses frame 10 on the virtual head 20 with sufficient accuracy to allow measurements of optometric values and, in particular, the measurements required to manufacture the glasses lenses, as well as to define how to manipulate the real glasses frame.

The process for measuring optometric values and for manipulating a glasses frame 100 is implemented in an electronic computer comprising at least one processor for performing operations and at least one memory for storing data.

The process 100 comprises a process of loading 200 said virtual head 20 into said at least one memory and a process of loading 300 said virtual glasses frame 10 into said at least one memory.

The process for measuring optometric values and manipulating a glasses frame 100 comprises the process for positioning 400 the virtual glasses frame 10 on the virtual head 20.

Figure 4:
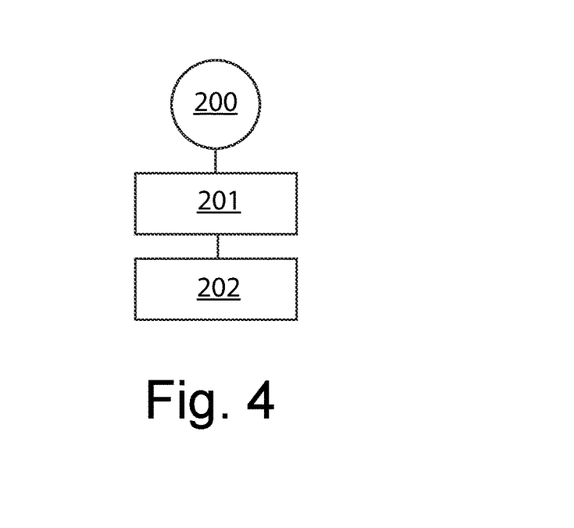
FIG. 4 is a block diagram of a process for loading a virtual model of a head.

The process for loading 200 said virtual head 20 into said at least one memory preferably comprises a process for remotely measuring 201 physical characteristics of a head of a person who wants to wear the glasses frame and a calculation process 202 of a virtual model of the head of the person 20, otherwise called virtual head 20.

The process of remotely measuring 201 physical characteristics of a person's head preferably comprises a face-scanning process aimed at generating a virtual 3D model of the person's head. This generated 3D model is based on known state-of-the-art deformable statistical models.

The calculation process 202 of the virtual model of the head of a person 20 comprises an operation of making the virtual model of a head of a person 20 wearing glasses by means of a grid of a plurality of points 21.

Figure 3:
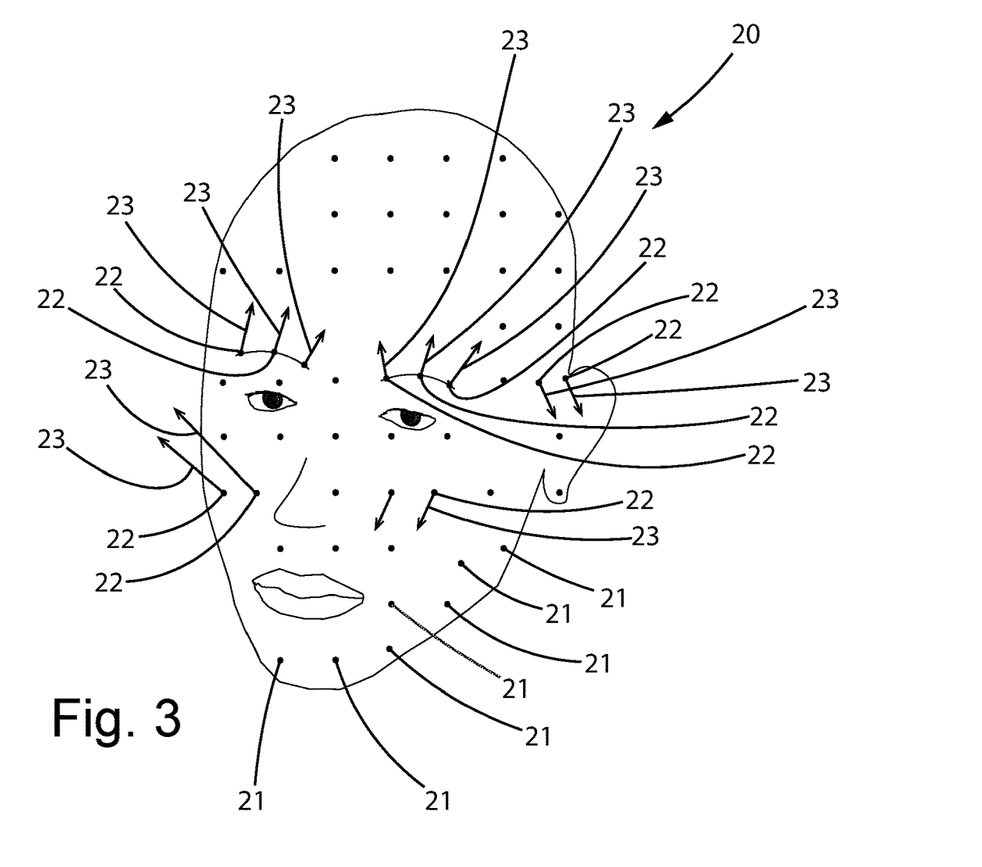
FIG. 3 is a schematic view of a three-dimensional model of a virtual head of a person.

The virtual model of the virtual head 20 comprises the grid of said plurality of points 21 arranged in three dimensions to interpolate a real head of a person, wherein said plurality of points 21 comprises a lesser multiplicity of anchor points 22 and a respective plurality of normal vectors 23 departing from said anchor points 22, wherein each normal vector 23 is perpendicular to a geometric surface around the respective anchor point 22, wherein said geometric surface represents a surface of the virtual model of the head 20 around the respective anchor point 22. Normal vectors 23 are used to define constraints in terms of point-to-plane distance, such as non-penetration constraints between virtual glasses 10 and the face of the virtual head 20. A plane is defined as the geometric surface of a geometric neighbourhood of the point 22 of the virtual head 20 that interpolates the real shape of the person's head.

It should be noted that the anchor points 22 of the virtual head 20 are calculated by the calculation process 202 by means of an iterative calculation operation to find the multiplicity of anchor points 22 among the points 21 of the plurality of points 21 of the grid and are not pre-set.

The calculation process 202 comprises an iterative calculation operation that identifies anchor points 22 among the points 21 of the virtual head.

The calculation process 202 comprises a calculation operation that at each anchor point 22 identifies a geometric plane that interpolates a shape of the person's actual head and calculates a normal vector 23 with respect to said geometric plane from the anchor point.

The process of loading 200 requires the virtual head 20 to be loaded into said at least one memory.

The process of loading 300 the virtual frame 10 involves loading said virtual frame 10 into said at least one memory.

Figure 2:
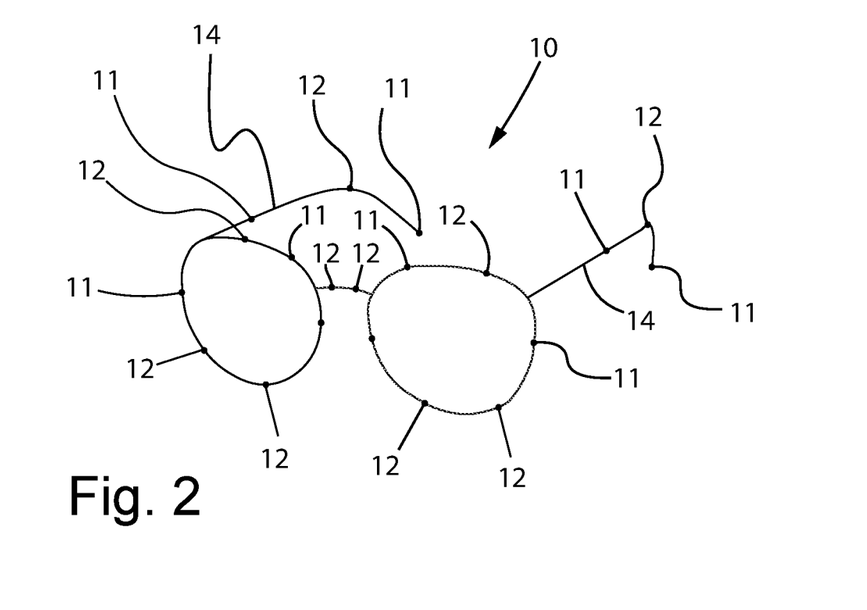
FIG. 2 is a schematic view of a three-dimensional model of virtual glasses.

Said virtual frame 10 is pre-set, i.e., previously created through a virtual frame 10 calculation process.

The virtual frame 10 comprises a three-dimensional virtual grid of a plurality of points 11 arranged in three dimensions to interpolate a real glasses frame, wherein said plurality of points 11 comprises a smaller plurality of anchor points 12.

In contrast to the anchor points 22 of the virtual head which are calculated 202, the anchor points 12 are points 11 of the grid of the virtual frame 10 predefined according to the characteristics of the actual frame.

The anchor points 12 are the points 11 of the grid that allow, together with virtual constraints obtained by the positioning process 400 to obtain the positioning data by the positioning process 400.

The three-dimensional grid of the plurality of points 11 of the virtual frame 10 defines the shape and type of the glasses frame to be placed on the person's head. Each type of glasses frame includes a respective virtual frame 10 that represents it through a respective three-dimensional virtual grid of points 11.

Said at least one processor processes both the virtual frame 10 and the virtual head 20 from said at least one memory.

Figure 5:
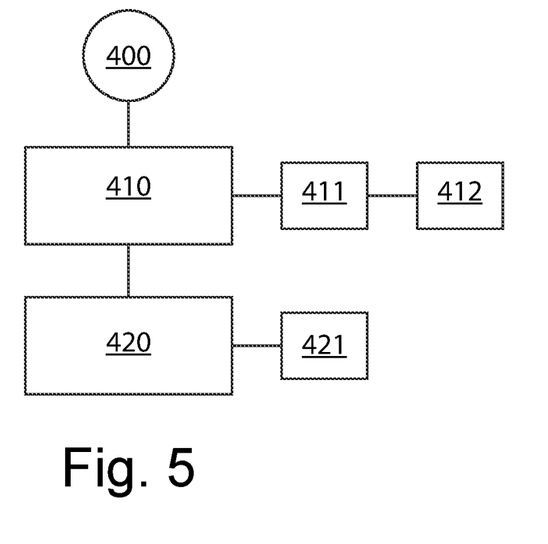
FIG. 5 is a block diagram of a process for positioning the virtual frame on the virtual head.

The process for positioning 400 the virtual frame 10 on the virtual head 20 is an iterative process whereby said at least one processor iteratively calculates increasingly precise positioning data of a position of the virtual frame 10 relative to the virtual head 20 until a predefined accuracy is achieved. The positioning data comprise virtual constraints and anchor points 12 of the virtual glasses frame 10, which are the data required to optimally position the virtual glasses frame 10 on the virtual head 20 to an accuracy sufficient to permit measurements of the optometric values and in particular with regard to the measurements required to make the glasses lenses.

The process 100 comprises a process for storing positioning data 500, wherein said at least one processor stores in said at least one memory the optimized positioning data at the end of the iterative process to position 400 the virtual frame 10 on the virtual head 20.

The process 100 also comprises a process for calculating 600 optometric values wherein said at least one processor processes the optimized positioning data and calculates the optometric values.

Optimized positioning data are intended to mean positioning data of predefined accuracy, whereby said predefined accuracy is such that lenses can be made for the glasses frame.

The process for positioning 400 the frame of the virtual glasses 10 on the virtual head 20 is advantageously able to virtually position the virtual frame 10 on the virtual head 20.

The positioning process 400 is based on a combination of nonlinear multi-stage constrained optimization and rigid-body physical simulation.

The process for positioning 400 the virtual frame 10 on the virtual head 20 comprises a first multi-stage iterative process 410 comprising a constrained nonlinear multi-stage optimization operation 411, a constrained nonlinear optimization operation 412 and then a second iterative process 420 comprising a collision detection step 421.

Advantageously, the process for positioning 400 the virtual frame 10 on the virtual head 20 allows for high precision in the digital measurements made on virtual three-dimensional grids of points 11, 21.

Figure 6:
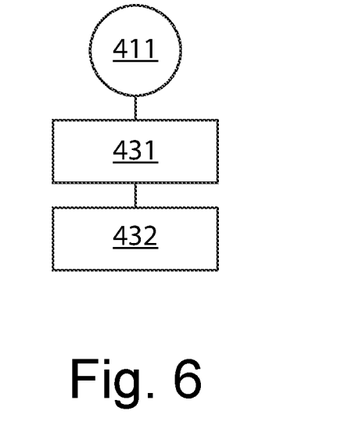
FIG. 6 is a block diagram of a multi-stage constrained optimization operation.

The multi-stage constrained nonlinear optimization operation 411 comprises an operation of aligning 431 of the virtual frame 10 with respect to virtual head 20.

This operation of aligning 431 requires the processor to initially find an approximate and reasonable alignment between the grid 11 of the virtual glasses model 10 and the grid 21 of the virtual head model 20 based on the anchor points 12 detected by the input memory. Then starting from the approximate alignment, the processor iteratively changes a multiplicity of parameters defining the two grids 11, 21 of the virtual head model 20 and the virtual glasses model 10 so as to minimize a cost function of a distance between each point 12 of the first set of anchor points 12 and each respective point 22 of the second set of anchor points 22. For example, a first point 12 of the first series of points 12 is an anchor point 12 of an arm 14 of the virtual glasses frame 10 and the respective second point 22 of the second series of points 22 is an anchor point 22 of an ear of the virtual head model 20.

The cost function is a function that maps an event or values of several variables onto a real number representing a cost associated with the event. A solution to the optimization problem minimizes the cost function.

The cost function minimizes the distances between points 21 and points 11 and depends on the sum of the distances between corresponding points 21 on the face of the virtual head 20 and the points 11 of the virtual glasses 10.

Optimization minimizes the cost function within a search space that is defined by a rotation and translation matrix of the virtual glasses 10. The process stops when the processor finds the rotation and translation matrix that minimizes the cost function according to a predefined tolerance that is deemed acceptable.

For example, the process can be stopped when the cost function has a tolerance of less than an order of magnitude of $10^{-9}$ or even $10^{-12}$.

The second iterative process 420, constrained by the data of the first multi-stage iterative process 410, comprises the collision detection operation 421 which is actually an operation aimed at preventing collisions (intersections) between the grid of points 21 of the virtual head 20 and the grid of points 11 of the virtual frame 10, exploiting the constraints obtained from the first multi-stage iterative process 410.

The second iterative process 420 is subject to a set of constraints aimed at preventing intersections between the three-dimensional grids 11, 21 of the glasses 10 and the head 20. To do this, the constraints are defined in terms of point-plane distances, where the points are the anchor vertices 12, 22 on the grid of the glasses 10 and the planes are defined by the anchor vertices 22 on the grid of the head 20 and the corresponding normal vectors 23.

The imposition that a point-to-plane distance is greater than zero implies that a vertex on the grid 11 of the virtual glasses 10 is outside or does not intersect the grid 21 of the virtual head 20. The point-to-point distance offers advantages of shorter calculation times.

Alternatively, a different point-to-plan distance can be provided.

The process for optimally positioning 400 the virtual model of the glasses frame 10 with the virtual model of the person's head 20 comprises a storing operation 500 in which the processor stores in the memory the optimized parameters of the grid 11 of the virtual glasses model 10, which are the optimized anchor points 12 and the virtual constraints, defining with these parameters a roto-translation matrix of a constrained nonlinear optimization, which is a solution. Note that the points 22 of the virtual head 20 remain unchanged and only the points 12 of the virtual glasses 10 are modified. The solution stored in the memory is the rotation and translation matrix to be applied to the grid 11 of the virtual glasses 10.

Preferably, the process for optimally positioning 400 the virtual model of the glasses frame 10 with the virtual model of the person's head 20 comprises a constrained optimization operation 430 of the virtual model of the glasses 10.

The output of the alignment operation 431 of the virtual glasses 10 provides an acceptable initial alignment, but it is preferable to meet additional requirements to achieve the most realistic positioning possible.

These nonlinear constrained optimization operations 411, 412 of the virtual glasses model 10 aims to refine the positioning of the virtual glasses 10 by solving a further constrained optimization in which a second cost function is still defined in terms of Euclidean distances between anchor points 12, 22, constraints still defined in terms of point-plane distances, but the search region of the minimum distance values between the respective points 12, 22 of the first 12 and second set of anchor points 22 is limited within a predefined range of values compared to the previous solution.

The default value range is one of the hyper-parameters through which the positioning problem is modelled. Such ranges are obtained inductively by analysing and modelling the requirements expressed by subject matter experts.

The search value range settles around the parameters previously found, e.g. it may be between 2% and 8%, preferably 5%.

Figure 7:
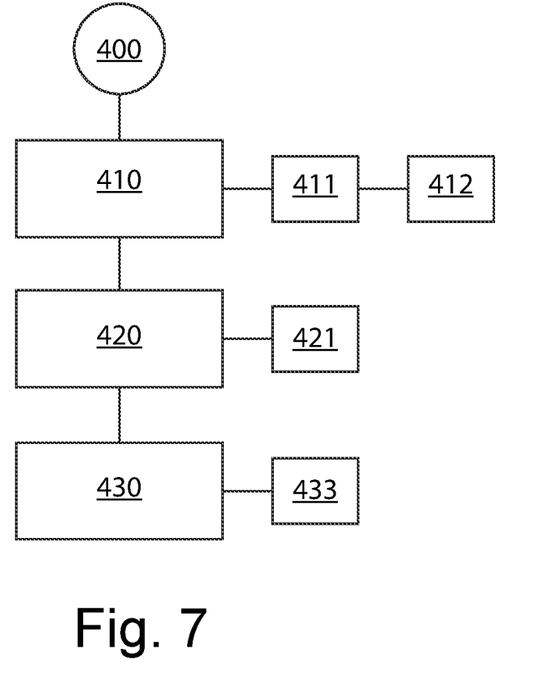
FIG. 7 is a block diagram of an alternative process for positioning the virtual frame on the virtual head.

Even more preferably, the process for optimally positioning 400 the virtual model of the glasses frame 10 with the virtual model of the person's head 20 comprises a third iterative process 430 comprising an adjustment operation 433 of the virtual glasses 10.

During this adjustment operation 433 of the virtual glasses 10 all significant, still existing collision problems are advantageously solved, preventing the violation of those constraints observed during the previous steps.

During the adjustment 433 of the virtual glasses 10, a sliding of the virtual glasses 10 along a virtual nose of the virtual head model 20 is simulated to ensure a realistic fit of the glasses or even provide users with different levels of fit depending on their own twist preferences.

Since in the multi-stage part of the proposed methodology the virtual glasses 10 are treated as rigid, undeformable bodies, the output solution always shows severe collisions between the arms 14 of the virtual glasses 10 and the temples of the virtual head 20. The frame of the virtual glasses 10 is then subjected to the next deformation step.

Figure 8:
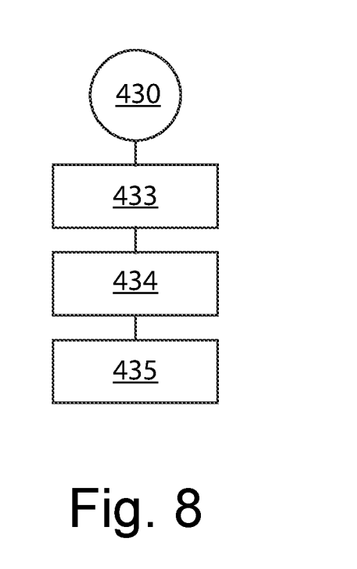
FIG. 8 is a block diagram of a third alternative iterative process to that of FIG. 7.

Even more preferably, the third iterative process 430 comprises a fourth deformation operation 434 of the arms 14 of the virtual glasses model 10.

The fourth deformation operation 434 deforms the virtual arms 14 of the virtual frame 10 and a fifth two-dimensional collision detection operation 435 between the virtual arms 14 and the virtual head 20 using collision detection algorithms to detect when collisions occur between the virtual arms 10 and the virtual head 20.

Preferably, a Gilbert-Johanson-Keerthi (GJK) algorithm, which is designed for use with convex polyhedra in 2D and 3D and is used to overcome this problem efficiently, is used for the collision detection operation 435 between the virtual arms 14 and the virtual head 20. GJK is a collision detection algorithm.

Although GJK is designed to work in both 2D and 3D, it is preferably intended to reduce this 3D problem to a 2D problem. The solution reduces the dimensionality of the problem to a 2D planar problem by determining on which 2D plane the arms 14 of the glasses model 10 lie and slicing the three-dimensional grid of points 11 along this plane. Slicing means moving in the XZ plane, considering the section of the virtual head 20 passing through the anchor points 22 at the ears of the virtual head 20. The resulting collection of vertices of convex polyhedra will form a solution basis for the GJK algorithm which defines a convex solution of convex polyhedra. The resulting set of vertices will form the envelope or closure of the set of vertices for the GJK algorithm. If the envelope is not complete, an interpolation process is required, preferably through the Dyn-Levin-Gregory algorithm.

If the solution base does not make the polyhedron convex, then a separate algorithm is applied to make it convex. In fact, the GJK algorithm assumes that the shape is convex.

The adjustment operation 430 of the virtual glasses 10 involves the virtual arms 14 being moved by the processor from the inside to the outside until they stop colliding with the virtual temples of the head 20 and the contact points are noted in the memory by the processor. These contact points will become the centres of the anchor points 22 of reference for the temples of the virtual head 20.

The constraints are defined for the minimization problem and are neither changed nor stored.

Advantageously, the process 100 adopts explicit rules in a form that facilitates the integration of new rules by experts in the field or deduced from the data.

Advantageously, the calculation time of the GJK algorithm is considerably reduced through its 2D reformulation.

Advantageously, the process 100 allows the positioning of the virtual glasses 10 on the virtual face 20 as a combination of multi-stage nonlinear constrained optimization and collision detection algorithms.

Even more preferably, it is possible to use the optimized data of the process for positioning 400 the virtual frame 10 on the virtual head 20 in order for artificial intelligence to learn how to identify the anchor points 22 of the virtual head 20 so as to determine initial data from which to start the process 100.

Advantageously, optimization operations are subject to ad-hoc constraints that can be driven by data obtained from the process 100 or suggested by subject matter experts, such as opticians, in fact it is possible to formalize explicit constraints expressed by subject matter experts, opticians, or use machine learning to infer rules from recurring patterns in a possible database of correct fitting examples.

Advantageously, the implementation of the process 100 by means of virtual intelligence can make it possible to map optimal reference points on the face, which are strongly correlated to various subject-related characteristics such as a nose shape, cheek prominence, etc. and to the characteristics of the glasses such as the glasses material, nose pad geometry, etc.

Artificial intelligence makes it possible to automatically learn the optimal anchor points 22 of the face 20 by exploiting information from the physical measurements of real people's heads or from the process for optimally positioning 400 the virtual model of the glasses frame 10 with the virtual model of the person's head 20.

The process for optimally positioning 400 the virtual model of the glasses frame 10 with the virtual model of the person's head 20 implemented with artificial intelligence comprises an artificial intelligence teaching operation by inputting data comprising virtual models of glasses 10 and virtual models of heads 20 already coupled so that the set of anchor points 12, 22 and constraints are known.

The artificial intelligence is instructed by the learning system to recognize optimal anchor points 12, 22 and optimized constraints based on already known coupled data.

Similarly, it is possible to teach the artificial intelligence to identify the anchor points 12 of the virtual glasses 10 either based on the geometries of the 3D model of the frame 10 or by taking into account the characteristics of the user's face 20.

During the artificial intelligence learning step, the operation of positioning the virtual glasses 10 on the face is done by means of the same multi-stage algorithm detailed in the previous pages. During this step, the neural network "learns" which are the optimal anchor points on the grid of the face. The concept of optimum, in this case, refers to the minimization of a cost function based on the physical measurement under consideration.

During the inference step, on the other hand, given a grid of the face and the grid 11 of the virtual glasses 10, the network makes a prediction (inference) of the anchor points on the grid of the face to be used during the positioning process of the virtual glasses (identical process to that described above).

The system input is comprised of 3D face grids 20. A deep learning-based architecture extracts a set of features which, in this specific scenario, represent the reference points of the face 21 to be used during the process for optimally positioning 400 the virtual model of the glasses frame 10 with the virtual model of the person's head 20. These features, together with the anchor points 12 of the virtual glasses 10, feed the virtual positioning system described above in a deterministic manner. The grid 21 of the virtual head 20 with the virtual glasses 10 worn undergoes an optimization process that provides an estimate of the physical quantity of interest such as pupil position, face shape and glasses frame shape.

During the artificial intelligence instruction step, for each input such as pupils, face and glasses, there is a fundamental truth value for the physical quantity of interest. The parameters of the architecture are learned in order to minimize a cost function.

The artificial intelligence trained as described represents a feature extractor which, given as input a grid of the face 20 and a grid of the glasses 10, is able to predict the best anchor points 12, 22 of the virtual face 20 and the virtual glasses 10 to be used for positioning the virtual glasses 10. Such a model advantageously improves the end result of glasses lens fitting while retaining the explicit rule-based approach of the lens fitting process, with the aforementioned advantages of result inspection and continuous improvement through rules and refinements of constraints and anchor points 12, 22.

In general, the process for optimally positioning 400 the virtual model of the glasses frame with the virtual model of the person's head is implemented by means of artificial intelligence that is trained by providing as input the combined data that optimizes the anchor points 12, 22 between virtual models of glasses 10 and virtual models of heads 20, wherein said trained artificial intelligence receives as input a three-dimensional grid of the head 21 and a three-dimensional gird of the glasses 11, wherein the artificial intelligence predicts the optimized anchor points 12, 22 to be used for the virtual positioning of the glasses 10 based on the training received.

Advantageously, the process for optimally positioning 400 the virtual model of the glasses frame 10 with the virtual model of the person's head 20 implemented with artificial intelligence comprises physics-informed machine learning techniques in which the learning step is supported by physically interpretable phenomena.

Advantageously, this solution preserves the possibility of explicit rule formulation by separating the machine learning components from the physics-informed part.

The process 100 of the present disclosure may be implemented in a computer program comprising computer code running on the electronic computer performing the operations of the process 100.

Alternatively, it is envisaged that the process 100 does not necessarily involve the remote measurement 201 of the person's head, but that the virtual head 20 is loaded into the memory from previous measurements through the loading process 200 of the virtual head model 20.

Alternatively, it is possible to envisage that anchor points 12 of the virtual frame 10 can also be automatically inferred in the same way as explained for the anchor points 22 of the virtual head 20. In this case, the loading process 300 envisages calculating the anchor points 12.

Advantageously, the process for measuring optometric values and for manipulating a glasses frame 100 overcomes the disadvantages of the prior art by allowing the accuracy to be such that all the data are available for making glasses frame lenses by taking remote measurements necessary for the manufacture of the lenses, for producing customized glasses, for providing aesthetic indications of the correct position of the glasses in relation to the person's head and for assessing a degree of comfort in relation to the possibility of deformation of the arms and frame.

The present disclosure thus conceived is susceptible to many modifications and variants, all falling within the same inventive concept. In practice, the materials used, as well as their dimensions, can be of any type according to the technical requirements.

The invention claimed is:

1. A computer-implemented method for measuring optometric values and for manipulating a glasses frame (100) implemented in an electronic computer comprising at least one processor for performing operations and at least one memory for storing data, wherein said process (100) comprises: a process of loading (200) a virtual model of a head (20) of a person into said at least one memory comprising, a calculation process (202) of said virtual head (20) which comprises: an operation of making said virtual model of said virtual head (20) comprising a grid of a plurality of head grid points (21), an iterative calculation operation identifying a multiplicity of head anchor points (22) chosen among the plurality of head grid points (21) of the virtual head (20), a calculation operation of a plurality of normal vectors (23) which in correspondence of each head anchor point (22) of the plurality of head anchor points (22) identifies a geometric plane interpolating a portion of a real head of a person and calculates a normal vector (23) which is perpendicular with respect to said geometric plane, a process of loading (300) a virtual glasses frame (10) into said at least one memory, wherein said virtual frame (10) comprises a three-dimensional grid defined by a plurality of glasses grid points (11) comprising a plurality of glasses anchor points (12), a process for positioning (400) the virtual glasses frame (10) on the virtual head (20) which is an iterative process providing that said at least one processor iteratively calculates a plurality of positioning data of a position of the virtual glasses frame (10) with respect to the virtual head (20) until positioning data of a predefined accuracy are obtained, a process of storing (500) said positioning data of predefined accuracy in said at least one memory, a process for calculating (600) the optometric quantities providing that said at least one processor processes the predefined accuracy positioning data and calculates the optometric quantities, wherein said optometric quantities are suitable for obtaining data for making eyeglass wherein positioning (400) the virtual glasses frame (10) on the virtual head (20) further comprises: inputting, into a neural network, previously generated virtual models of glasses (10) having glasses anchor points coupled to previously generated virtual models of heads (20) having head anchor points and mapping the glasses anchor points to the head anchor points;

training the neural network to determine correct fits of the previously generated virtual models of glasses (10) with respect to the previously generated virtual models of heads (20); training the neural network to learn optimal glasses anchor points and optimal head anchor points in response to determining each of the correct fits; and performing the process of positioning (400) to align the virtual glasses frame (10) on the virtual head (20) by minimizing a distance between the optimal glasses anchor points of the virtual glasses (10) and the optimal head anchor points of the virtual head.

2. The computer implemented method (100) according to claim 1, characterized in that said process of loading (200) said virtual head (20) into said at least one memory comprises a method of remote measurement (201) of physical characteristics of a head of a person wearing the glasses frames.

3. The computer implemented method (100) according to claim 2, characterized in that said process for measuring physical characteristics of the head (201) comprises at least one three-dimensional scanning operation of the person's head.

4. The computer implemented method (100) according to claim 1, characterized in that the process for positioning (400) the virtual glasses frame (10) on the virtual head (20) comprises:
- a first multi-stage iterative process (410) comprising:
- a multi-stage constrained nonlinear optimization operation (411),
- a constrained nonlinear optimization operation (412)
- a second iterative process (420) comprising
- a collision detection operation (421).

5. The computer-implemented method (100) according to claim 4, characterized in that said multi-stage constrained nonlinear optimization operation (411) comprises an operation of aligning (431) the virtual glasses frame (10) with respect to the virtual head (10), wherein said at least one processor iteratively changes a multiplicity of parameters defining the two grids that include the plurality of glasses grid points (11) of the virtual glasses frame (10) and the plurality of head points (21) of the virtual head (20) in order to minimize a cost function of a distance between each glasses anchor point (12) of the virtual glasses frame (10) and each respective head anchor point (22) of the virtual head (20).

6. The computer implemented method (100) according to claim 5, characterized in that the minimization of the cost function occurs within a search space which is defined by a rotation and translation matrix of the virtual glasses frame (10),
wherein said minimization stops when the processor Identifies a rotation and translation matrix minimizing the cost function according to a predefined tolerance.

7. The computer implemented method (100) according to claim 4, characterized in that the process for positioning (400) the virtual glasses frame (10) on the virtual head (20) comprises:
- a third iterative process (430) comprising a third adjustment operation (433) of the virtual glasses (10) simulating a sliding of the virtual glasses (10) onto a virtual nose of the virtual head (20).

8. The computer implemented method (100) according to claim 7, characterized in that the third iterative process (430) comprises:
- a fourth deformation operation (433) of arms (14) of the virtual glasses (10),
- a fifth two-dimensional collision detection operation (435) between virtual arms (14) and virtual head (20).

9. The computer implemented method (100) according to claim 4, characterized in that said collision detection operation (421, 435) uses a method for calculating the point-to-plane distance.

10. The computer implemented method (100) according to 4, characterized in that said collision detection operation (421, 435) uses a Gilbert-Johanson-Keerthi (GJK) algorithm.

11. The computer implemented method (100) according to claim 1 implemented by an artificial intelligence.

12. A computer program product including computer readable instructions loadable into a memory of an electronic computer, the computer readable instructions which when the program is executed by the computer, implement a method for customizing glasses to a head of a person (100) according to claim 1.

* * * * *